United States Patent Office 2,770,576
Patented Nov. 13, 1956

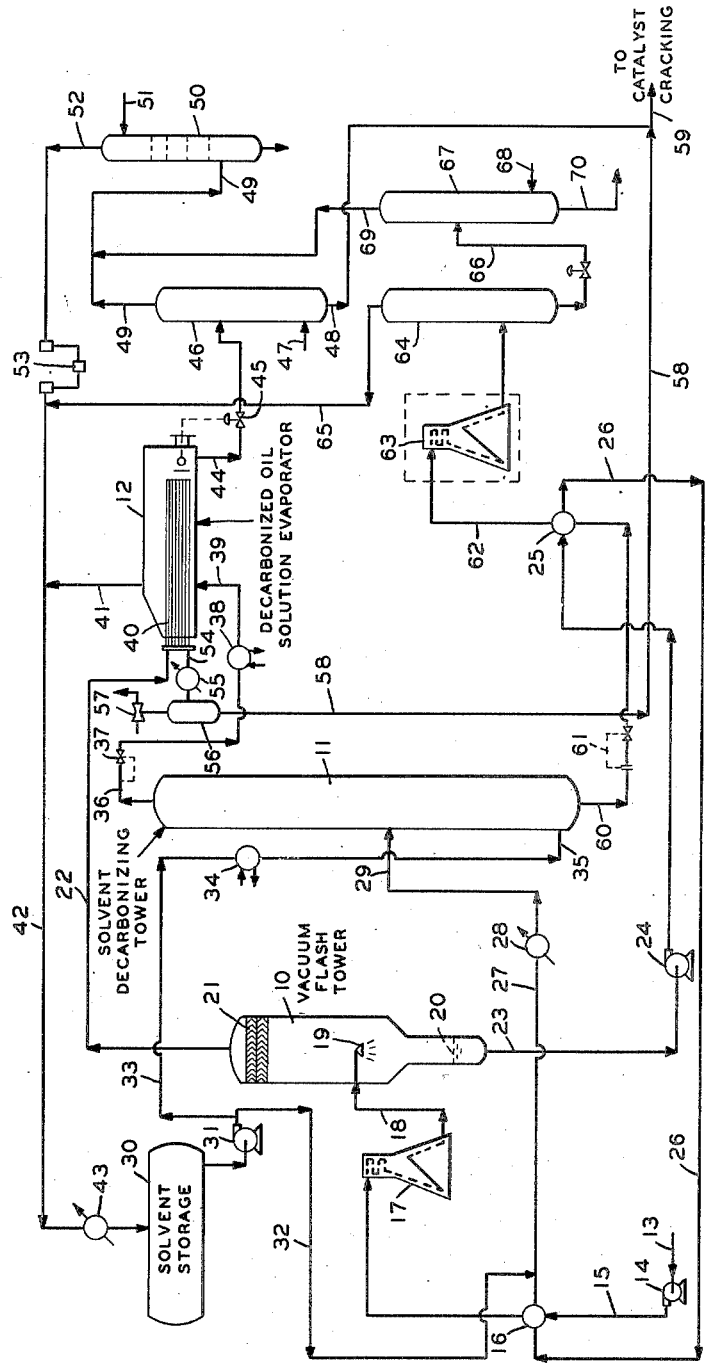

2,770,576

PREPARATION OF CATALYTIC CRACKING FEED

Thomas W. Pratt, Rutherford, N. J., assignor to The M. W. Kellogg Company, Jersey City, N. J., a corporation of Delaware Application June 3, 1954, Serial No. 434,181

4 Claims. (Cl. 196—14.46)

This invention relates generally to the preparation of petroleum oil for catalytic conversion to gasoline. The process begins with the heavy residuum remaining after initial distillation of crude petroleum under pressures which are only slightly above atmospheric pressure; this residuum is usually referred to as topped crude or atmospheric crude. The object of the process is to separate from said atmospheric crude as large a fraction as possible of oil which is suitable for charging to a catalytic cracking reactor, without uneconomic consequences to the catalyst or product.

More particularly, this invention relates to a process in which the atmospheric reduced crude is subjected to a vacuum distillation in a small and relatively simple flash tower (usually at relatively low temperatures between about 620° F. and about 710° F., or within the range of about 100° F. below that at which substantial thermal decomposition begins to take place); the vacuum bottoms are then fractionated under paracritical conditions (i. e., at temperatures within 100° F. below the critical temperature of the solvent used) with propane, or a mixture of propane and butane, or a similar solvent or solvent mixture, with an unusually low solvent to oil ratio (preferably between about 2.5:1 and about 4:1); the hot vapor overhead from the vacuum distillation is heat exchanged against the extract phase from the solvent fractionation simultaneously to condense oil vapor and evaporate solvent, substantially complete solvent evaporation being achieved by selection of a vacuum distillation pressure low enough to supply the required quantity of hot oil vapor; and combining the condensed oil vapor and the decarbonized oil recovered from the solvent extraction to make a charge oil for catalytic cracking which comprises a substantially higher percent of the atmospheric reduced crude than has been possible with previous processes (other conditions, particularly catalyst contamination, being substantially the same). At the same time, feed so prepared produces more gasoline for a given amount of coke and gas than feed prepared by either vacuum distillation or solvent decarbonization alone.

In decarbonizing, the objective is to extract by the action of the solvent as much oil as possible without any of the asphaltic components. Propane itself is highly selective for dissolving the more paraffinic and more saturated hydrocarbons, while rejecting the highly cyclic, hydrogen poor, probably oxygenated asphaltic components. These rejected materials are the components which form large amounts of carbon when cracked in the catalytic cracking unit. Furthermore, the complex asphaltic components always contain more or less metals in the form of metallo-organic structures, some of which have been determined to be porphyrins, or something similar. All of these materials, while relatively insoluble in propane are highly soluble in heavy distillates such as that which it is proposed to distill in the vacuum flash section. It is therefore beneficial to remove these distillates before decarbonizing because their presence in the extract phase solution increases the solubility of asphalt therein, and decreases the ability of the solvent to distinguish between oils and asphalts.

If the decarbonizing process alone were used, it would be possible to retain selectivity in the presence of large amounts of oil by increasing the propane:oil ratio thus bringing down the concentration; however, when the short residua are charged to decarbonizing, this "dilution" is not required and lower propane ratios are effective.

A specific embodiment of the invention is shown in the accompanying drawing in which the principal parts are vacuum flash tower 10, solvent decarbonizer tower 11 and decarbonized oil solution evaporator 12.

Atmospheric reduced crude enters the system at 13, is pumped by pump 14 to a suitable furnace charging pressure (usually less than 60 pounds p. s. i. g.) and is passed by way of line 15 through heat exchanger 16 to a furnace 17 in which the reduced crude is heated to vacuum distillation temperature. The hot oil then goes from furnace 17 to vacuum flash tower 10 by way of line 18.

Vacuum flash tower 10 is an extremely simple piece of apparatus in comparison with the vacuum flash towers ordinarily used in petroleum refining. Since the hot reduced crude is to be separated only into one liquid and one vapor fraction, and since even this fractionation need not be precise, precise separation being left to subsequent solvent fractionation of the vacuum bottoms, it is not necessary to have bubble trays, reflux, sidestream draw-offs, steam strippers, or extended tower height. The hot oil discharges into the almost empty interior of flash tower 10 through a spray 19. Liquid collects in the bottom as indicated at 20. Vapors pass through a bed of suitable entrainment baffles 21, leaving the upper end of vacuum flash tower 10 through line 22 at a temperature of between 620° F. and 710° F., i. e., at the highest temperature which can be achieved without excessive thermal decomposition of oil suitable for catalytic conversion into gasoline. This temperature will depend upon crude properties which vary from crude to crude, so that some crudes will tolerate 20° F. or 30° F. higher vapor temperatures than others, given a certain maximum thermal decomposition to be tolerated. However, the preferred maximum temperature for any practical degree of thermal decomposition for any crude will fall within the narrow range specified.

The temperature of the unevaporated oil 20 accumulated in the lower end of vacuum flash tower 10 will ordinarily be 20° F. to 50° F. hotter than the vapor temperature; and the oil may experience temperatures slightly above 710° F. as a result of heating in furnace 17, but this higher temperature should be transitory only. The vapors leaving by way of line 22 ought to be maintained at a substantially constant pre-determined temperature selected from within the described range.

The topped crude (comprising between 25% to 90% of the original crude) is separated by a relatively simple vacuum distillation in vacuum flash tower 10 into about 25% to 75% vacuum bottoms and vapor. The pressure under which the vacuum distillation is carried out will fall within a range of about 50 to 200 millimeters of mercury absolute pressure. While it is much preferred to maintain the temperature at the maximum temperature previously determined as tolerable from the standpoint of thermal decomposition, there is some latitude in selecting the pressure, and this latitude is to be used for balancing the heat carried overhead with the vapor against that required for substantially complete evaporation of solvent, in decarbonized oil solution evaporator 12, as will be described hereinafter. Although substantially complete solvent evaporation is desirable, under some conditions the heat balance may be such that a minor amount of evaporation may be necessarily accomplished by auxiliary heating e. g., high pressure steam.

The vacuum bottoms leave vacuum flash tower 10 by way of line 23 and are destined for decarbonization tower 11, but must first be cooled from temperatures of nearly 700° F. to a temperature suitable for solvent fractionation, ordinarily about 200° F. or lower. In the preferred form of the invention, this cooling is achieved by indirect heat exchange with raffinate phase from decarbonization tower 11 so as to cool the vacuum bottoms and evaporate substantially all solvent from said raffinate phase. This is accomplished by pumping the vacuum bottoms from line 23 by pump 24 through heat exchanger 25 and then by way of line 26 through heat exchanger 16, for heat exchange with incoming topped crude; and thereafter through line 27, and water cooler 28 to line 29 which charges the relatively cool vacuum bottoms to vertically extended decarbonization tower 11, preferably above the midpoint. From solvent storage 30, solvent is pumped by pump 31, partially by way of line 32 into line 27 to mix therein with vacuum bottoms and make them more fluid, and partly by way of line 33 and heat exchanger 34 to solvent inlet 35 at the lower end of decarbonizing tower 11. Heat exchanger 34 may be cooled by exchange against water or heated by exchange against low pressure steam, depending upon the tower temperature required.

The precision of this process is achieved in the solvent decarbonization step. Propane selectively dissolves low molecular weight components, but it also selectively dissolves paraffinic, and saturated molecules in preference to cyclic and unsaturated molecules. The decarbonization process is capable of taking overhead paraffinic materials of somewhat higher molecular weight boiling points than the unsaturated cyclics, which are rejected into the raffinate bottoms. Since metallo-organic components are generally complex cyclics, this means that the metal content of the catalytic cracking feed can be kept low when vacuum distillation and propane decarbonizing are integrated.

The vacuum distillation need only remove from the oil the bulk of the light fractions; however, considerable tolerance may be allowed on the side of leaving some distillable oil in the vacuum bottoms. It is in decarbonizing tower 11 that the vacuum bottoms are carefully stripped of all the oil suitable for cracking, while at the same time, undesirable components, e. g., condensed cyclics are left in the asphaltic raffinate. However, the preliminary vacuum distillation step, simple though it is, makes it possible to carry out suitable decarbonization with a much lower solvent to oil ratio than would otherwise be possible. Removal by vacuum distillation of the bulk of highly soluble light oil makes easier a nice discrimination in the solvent fractionation. When the light oil is present, the higher solvent ratio is necessary because the light oil tends to carry overhead components not wanted in the extract of decarbonized oil. Also, the total volume of oil to be changed to solvent decarbonizing is greatly reduced.

The extract phase from decarbonizing tower 11, consisting of a solvent solution of decarbonized oil, leaves the upper end of tower 11 by way of line 36, passes through pressure control valve 37 (which serves to maintain suitable tower pressure) through a low pressure steam heat exchanger 38 (in which it is warmed a few degrees) and then by way of line 39 into decarbonized oil solution evaporator 12, wherein substantially all of the solvent is evaporated by indirect heat exchange with hot vacuum flash vapors introduced by way of line 22 into tube 40 within decarbonized oil solution evaporator 12. Solvent vapor escapes from evaporator 12 through line 41 and returns to solvent storage 30 by way of line 42 and condenser 43. Evaporation is carried out under the solvent storage pressure of about 250 pounds p. s. i. g.

Decarbonized oil containing minor amounts of residual solvent is withdrawn from evaporator 12 through line 44, controlled by control valve 45, to decarbonized oil stripper 46, wherein steam introduced at 47 strips out remaining solvent traces. Decarbonized oil is withdrawn at 48. Stripping effluent leaves through line 49 and passes through jet condenser 50 (encountering cold water from line 51); the stream is condensed and the solvent vapors escape at the upper end of jet condenser 50 by way of line 52, to be recompressed by compressor 53 and then by way of line 42 and condenser 43 to solvent storage 30.

Distillate from vacuum flash tower 10 is mostly condensed in tubes 40, the condensate is withdrawn through line 54, and residual vapors are condensed in water cooler 55 and then passed to trap-out drum 56, upon which vacuum is maintained by ejector 57 and from the bottom of which liquified distillate is withdrawn to be combined with decarbonized oil by way of line 58 at 59. It will be understood, that in some refineries part of the liquified vacuum distillate may be diverted for other purposes, but ordinarily most of it will find its way to catalytic cracking.

The raffinate phase from solvent decarbonization is withdrawn from the solvent decarbonizer tower 11 through line 60, under control of level control valve 61 to be passed in heat exchange with vacuum distillation bottoms in heat exchanger 25 as previously described, and then by way of line 62 through a furnace 63 to asphalt flash drum 64, where solvent is separated from asphalt liquid (at storage pressure) and returned to storage by way of line 65. Liquid asphalt is carried by way of line 66 to asphalt stripper 67 in which residual solvent is separated by steam entering at 68, evaporated solvent going to jet condenser 50 by way of line 69 and asphalt being withdrawn at 70. It will be understood that a furnace will be unnecessary in most cases since heat exchanger 25 will be adequate for all the heat necessary. However, furnace 63 is shown to illustrate the more elaborate arrangement, based on the assumption that additional heating is necessary.

A numerical example of processing of Kuwait crude in accordance with the previously described specific embodiment of this invention may be based on a refinery having a 100,000 barrels per stream day of crude capacity. The Kuwait crude treated has a metal content, comprised of nickel and similar dehydrogenating metals amounting to about 100 parts per million of nickel equivalent. In a typical case, the crude is distilled at atmospheric pressure to produce 43,500 B. P. S. D. of topped crude, i. e., 43.5% residuum. The topped crude residuum is passed in indirect heat exchange with vacuum bottoms in heat exchanger 16, thus increasing in temperature from 200° F. to 300° F., and then through furnace 17 to enter vacuum flash tower 10 at a temperature of 712° F. Vacuum flashing separates the 43,500 B. P. S. D. of topped crude into two equal parts 21,750 B. P. S. D. of vacuum vapor being passed through the tubes of decarbonized oil solution evaporator 12, and mostly condensed therein. The condensate forms one component of the catalytic cracking feed.

The 21,750 B. P. S. D. of vacuum residuum is cooled from 690° F. to 475° F. in heat exchanger 25, and from 475° F. to 325° F. in heat exchanger 16. It picks up 5000 B. P. S. D. of cold propane from line 32, the mixture is reduced in temperature to 140° F., and introduced into decarbonizing tower 11 along with 60,250 B. P. S. D. of propane through line 35, and is separated into 13,100 B. P. S. D. of decarbonized oil extract (taken overhead with 56,400 B. P. S. D. of extract propane) and 8,700 B. P. S. D. of asphalt (taken off the bottom with 8,750 B. P. S. D. of raffinate propane). It will be understood that the "propane" referred to in this example is actually a solvent mixture of 70% propane and 30% butane. Thus, the topped crude is split 50% vacuum overhead, 30% decarbonized oil overhead, and 20% asphalt bottoms. The metal content of the vacuum overhead is zero, so far as industrial measurements are concerned; the decarbonized oil contains two parts per million of nickel equivalent, so that the mixture thus prepared for catalytic cracking feed has only .7 part per million of nickel equivalent.

The decarbonized oil extract leaves decarbonizing tower 11 at a temperature of 130° F., is cooled slightly in heat exchanger 38, and then enters decarbonized oil solution evaporator 12, in which 279,500 pounds per hour of propane is evaporated by heat exchange with the vacuum vapor; this is carried out at solvent storage pressure so as not to require any compression of this portion of the vapor.

The 13,100 B. P. S. D. of partially desolventized extract is then steam stripped of remaining propane in stripper 46, and combined with the vacuum overhead for passage to catalytic cracking.

The amount of vapor taken from the flash still is sufficient to carry out the desired evaporation of solvent from the decarbonized oil. With different stocks, it may be necessary to evaporate more or less solvent in decarbonized oil solution evaporator 12, and the depth of cut in vacuum flash tower 10 may be adjusted accordingly to balance the amount of heat in a flash vapor against the duty required in evaporator 12.

It will be understood, of course, that this process might be combined with additional processing of the decarbonized oil, or of the catalytic cracking feed, prior to catalytic cracking. The process of this invention applies to any expanded process in which the major parts of the decarbonized oil eventually form a part of the catalytic cracking feed.

Having described my invention, I claim:

1. A method for preparing a charge oil for catalytic cracking, which includes the steps of: heating an atmospheric reduced crude and introducing it into a vacuum flashing tower at a temperature sufficiently high to maintain within said tower a flashing temperature within the range of about 100° F. below that at which substantial thermal decomposition begins to take place; withdrawing from said tower a vacuum bottoms containing at least 25% of the oil suitable for catalytic cracking; cooling said vacuum bottoms and introducing it into a vertically extended fractionation zone and counter-currently contacting it therein with an upflowing stream of normally gaseous hydrocarbon solvent at temperatures within 100° F. below the critical temperature of said solvent to fractionate said vacuum bottoms into an asphalt raffinate and a decarbonized oil extract; and withdrawing hot vapors from said flashing tower and extract phase from said fractionation zone and passing them in indirect heat exchange with each other to condense most of said vapors and to at least partially evaporate solvent from said extract phase.

2. A method for preparing a charge oil for catalytic cracking, which includes the steps of: heating an atmospheric reduced crude and introducing it into a vacuum flashing tower at a temperature sufficiently high to maintain within said tower a flashing temperature within the range of about 100° F. below that at which substantial thermal decomposition begins to take place; withdrawing from said tower a vacuum bottoms containing at least 25% of the oil suitable for catalytic cracking; cooling said vacuum bottoms and introducing it into a vertically extended fractionation zone and counter-currently contacting it therein with an upflowing stream of normally gaseous hydrocarbon solvent at temperatures within 100° F. below the critical temperature of said solvent to fractionate said vacuum bottoms into an asphalt raffinate and a decarbonized oil extract; withdrawing hot vapors from said flashing tower and extract phase from said fractionation zone and passing them in indirect heat exchange with each other to condense most of said vapors and to at least partially evaporate solvent from said extract phase; and maintaining a pressure within said flashing tower which permits distillation of sufficient hot vapor at said flashing temperature to evaporate in said heat exchange all but a minor residual portion of solvent from said extract phase.

3. A method for preparing a charge oil for catalytic cracking, which includes the steps of: heating an atmospheric reduced crude and introducing it into a vacuum flashing tower at a temperature sufficiently high to maintain within said tower a flashing temperature below that at which substantial thermal decomposition occurs; withdrawing from said tower a vacuum bottoms comprised of at least 25% of the oil suitable for catalytic cracking; cooling said vacuum bottoms and introducing it into a vertically extended fractionation zone and counter-currently contacting it therein with an upflowing stream of normally gaseous hydrocarbon solvent at temperatures of within 100° F. of the critical temperature of said solvent to fractionate said vacuum bottoms into an asphalt raffinate and a decarbonized oil extract; withdrawing hot vapors from said flashing tower and extract phase from said fractionation zone and passing them in indirect heat exchange with each other to condense most of said vapors and to at least partially evaporate solvent from said extract phase; separately stripping residual solvent from said extract phase and combining the latter with at least part of said condensed vapors to form a catalytic cracking charge oil low in metal contaminants.

4. A method for preparing a charge oil for catalytic cracking, which includes the steps of: heating an atmospheric reduced crude and introducing it into a vacuum flashing tower at a temperature sufficiently high to maintain within said tower a flashing temperature within the range of about 100° F. below that at which substantial thermal decomposition begins to take place; withdrawing from said tower a vacuum bottoms comprised of at least 25% of the oil suitable for catalytic cracking; cooling said vacuum bottoms and introducing it into a vertically extended fractionation zone and counter-currently contacting it therein with an upflowing stream of normally gaseous hydrocarbon solvent at temperatures within 100° F. of the critical temperature of said solvent to fractionate said vacuum bottoms into an asphalt raffinate and a decarbonized oil extract; withdrawing hot vapors from said flashing tower and extract phase from said fractionation zone and passing them in indirect heat exchange with each other to condense most of said vapors and maintain a vacuum within said flashing tower at which the volume of hot vapors passing in indirect heat exchange with said extract phase is sufficient to evaporate all but a minor residual portion of the solvent from said extract phase; withdrawing raffinate phase from the lower end of said fractionation zone and passing it in indirect heat exchange with said vacuum bottoms flowing from said flashing tower to said fractionation zone to effect said cooling of said vacuum bottoms prior to their introduction into said vertically extended fractionating zone and to heat said raffinate phase to a temperature at which substantially all of the solvent content can be vaporized at storage pressure; separately stripping residual solvent from said extract phase and combining the latter with at least part of said condensed vapors to form a catalytic cracking charge oil low in metal contaminants.

References Cited in the file of this patent

UNITED STATES PATENTS

| | | |
|---|---|---|
| 2,121,517 | Brandt | June 21, 1938 |
| 2,528,586 | Ford | Nov. 7, 1950 |
| 2,616,912 | Dickinson | Nov. 4, 1952 |
| 2,685,561 | Whiteley et al. | Aug. 3, 1954 |